United States Patent [19]

Abboud et al.

[11] Patent Number: 5,658,609
[45] Date of Patent: Aug. 19, 1997

[54] FAT REPLACEMENT SYSTEM

[75] Inventors: Amna Abboud, Cordova; Richard E. Moyers, Memphis, both of Tenn.

[73] Assignee: Kraft Foods, Inc., Northfield, Ill.

[21] Appl. No.: 568,593

[22] Filed: Dec. 5, 1995

Related U.S. Application Data

[63] Continuation-in-part of Ser. No. 268,833, Jun. 29, 1994, abandoned.

[51] Int. Cl.$^6$ .................................................. A23D 7/015
[52] U.S. Cl. .......................... 426/609; 426/285; 426/653; 426/804
[58] Field of Search ................................. 426/549, 653, 426/804, 285, 609

[56] References Cited

U.S. PATENT DOCUMENTS

| | | | |
|---|---|---|---|
| 2,913,342 | 11/1959 | Cameron . | |
| 4,678,672 | 7/1987 | Dartey | 426/804 |
| 4,748,027 | 5/1988 | Schou | 426/804 |
| 5,021,248 | 6/1991 | Stark | 426/804 |
| 5,066,511 | 11/1991 | Cherukuri et al. | 426/658 |
| 5,145,702 | 9/1992 | Stark | 426/804 |
| 5,306,514 | 4/1994 | Letton | 426/531 |
| 5,330,778 | 7/1994 | Stark | 426/804 |
| 5,350,590 | 9/1994 | McCarthy | 426/549 |
| 5,356,644 | 10/1994 | Handrick | 426/804 |
| 5,360,627 | 11/1994 | Desai | 426/804 |
| 5,516,543 | 5/1996 | Amankonah | 426/804 |

*Primary Examiner*—Carolyn Paden
*Attorney, Agent, or Firm*—Fitch, Even, Tabin & Flannery

[57] ABSTRACT

The present invention is directed to a particulate fat replacement system and to baked goods utilizing the fat replacement system. The fat replacement system can be used as a partial or complete replacement for shortening in flour based baked goods. The fat replacement system includes in combination (a) an emulsifier powder which includes a carrier, propylene glycol monoester, mono- and di- glycerides, a polyoxyethylene derivative of polyol esters of fatty acids and diacetyl tartaric acid ester of monoglycerides and (b) an unhydrated mixture of a vegetable fiber, starch and a gum. The fat replacement system is present in the batter or dough used to provide a baked dough at a level of from about 0.5% to about 5% by weight.

30 Claims, No Drawings

FAT REPLACEMENT SYSTEM

CROSS-REFERENCE TO RELATED APPLICATION

This is a continuation-in-part of application Ser. No. 268,833 filed Jun. 29, 1994 now abandoned and entitled "Emulsifier System".

FIELD OF THE INVENTION

The present invention relates to the production of doughs and batters for producing baked goods, particularly reduced-fat and fat-free baked goods having a shelf life, softness and acceptance comparable to full-fat counterparts. More particularly, the present invention relates to a complete fat replacement system for use in bakery products.

BACKGROUND OF THE INVENTION

The consumer demand for fat-free and low fat baked products has increased recently due to public awareness of the health risks of dietary fat. This is especially true with baked items which contain relatively medium to high levels of fat which contribute heavily to their appetizing taste, flavor and appearance.

Many efforts have been made to remove or lower the fat content of baked products and still obtain an edible product from the oven. Fat-free or reduced-fat baked products usually require major reformulation. Also, replacing fat with prior art fat mimetics may require special processing and handling (i.e., high shear mixing or homogenization) which adds extra steps and/or equipment to the bakery process.

Numerous efforts have been directed to providing fat mimetic replacements for fat in baked products. U.S. Pat. No. 3,453,116 to Freund is directed to an emulsifier system which can be used to replace fat in baked products. The emulsifier system comprises a propylene glycol monoester of a fatty acid and a stabilizer for the fatty acid monoester. The stabilizer is an ionic surface active salt.

U.S. Pat. No. 4,242,366 to Morgan, et al. is directed to an emulsifier system for use in baked products, such as cakes, as a replacement for some or all of the shortening in the cake. The emulsifier system includes propylene glycol monoester, alpha monoglyceride and glyceryl lactoester.

U.S. Pat. No. 5,133,984 to Murphy, et al. is directed to doughs and batters which contain hydrated polysaccharide hydrocolloid, hydrated insoluble fiber and hydrated protein. The hydrated materials are added to the dough or batter formulation as an aqueous dispersion. The aqueous dispersion of the hydrated polysaccharide hydrocolloid, hydrated insoluble fiber and hydrated protein can be used to replace fat in baked goods.

The present invention relates to a particulate fat replacement system which can be used to completely replace fat in several bakery items, such as cakes, muffins, cookies, sweet dough products, pizza crust, pie crust and other baked goods. The provision of a particulate fat replacement system is highly desirable in that the particles are easily measured and dispensed. It is therefore an object of the present invention to provide fat-free and low fat bakery items which have similar organoleptic properties as those of full fat products.

It is also an object of the invention to provide a complete fat replacement system that is easy to use and does not require any further processing prior to use.

SUMMARY OF THE INVENTION

The present invention is directed to a particulate fat replacement system and to baked goods utilizing the fat replacement system. The fat replacement system can be used as a partial or complete replacement for shortening in flour based baked goods. The emulsifier system includes in combination (a) an emulsifier powder which includes a carrier, propylene glycol monoester, mono- and di- glycerides, a polyoxyethylene derivative of polyol esters of fatty acids and diacetyl tartaric acid ester of monoglycerides and (b) an unhydrated mixture of a vegetable fiber, starch and a gum. The fat replacement system is present in the batter or dough used to provide a baked dough at a level of from about 0.5% to about 5% by weight.

DETAILED DESCRIPTION OF THE INVENTION

The powder which is used in combination with the mixture of vegetable fiber, starch and a gum contains four components, these being, propylene glycol monoester, mono- and di- glycerides, a polyoxyethylene derivative of polyol esters of fatty acids and diacetyl tartaric acid ester of monoglycerides. The propylene glycol monoester and mono- and di- glycerides are very lipophilic emulsifiers. These components contribute to tenderness, moistness, volume and much of the fatty mouthfeel perceived. They are fat-like in nature. The polyoxyethylene derivatives have a positive influence on the closeness of the crumb cells (fine texture) and contributes to volume, perception of moistness and tenderness. The diacetyl tartaric acid ester of monoglycerides has a good balance of hydrophilic and lipophilic groups. The diacetyl tartaric acid ester of monoglycerides works as a dough conditioner in baked products contributing to gas retention and increased volume.

The propylene glycol monoester component in the powder is preferably supplied by a commercially available food grade emulsifier containing from about 30%–60% propylene glycol monoester, most preferably 50–60% propylene glycol monoester. The esterification of propylene glycol usually forms, firstly monoesters, each containing one hydroxyl and one fatty acid radical, and secondly, diesters with both hydroxyls being substituted with the fatty acid radicals. The monoesters constitute the component desired in the fat replacement system of the present invention; however, the usual mixture of about 60–90% monoester and the balance of diesters is satisfactory. The fatty acid used in the esterification reaction is preferably saturated and has a chain length of from 12 to 22 carbon atoms, preferably palmitic or stearic acid, or admixtures thereof. Specific partial esters which are suitable are propylene glycol monostearate, propylene glycol monopalmitate, propylene glycol monolaurate, alone or in combination with the comparable diesters and each other. Propylene glycol monoester is present in the emulsifier powder at a level of from about 14% to about 28% of a commercial food grade emulsifier, preferably from about 22% to about 28%. All percentages used herein are by weight unless otherwise indicated.

The mono- and diglyceride component of the powder is preferably supplied by a commercially-available food grade, mono-diglycerides. The mono-diglyceride may be prepared by known procedures involving the reaction of glycerin with certain fats, oils or fatty acids and is usually available as the crude reaction product which also comprises diglyceride, triglyceride, glycerin and free fatty acid. Commercial monoglycerides are also available in a relatively pure distilled form. Both alpha and beta isomers of monoglyceride are included in varying amounts, depending on whether the esterification occurs at the terminal or center carbon atom of the glycerin, but these isomers equilibrate by acyl migration upon storage to result in about 88% alpha monoglyceride.

The mono- and di- glycerides are present in the powder at a level of from about 9% to about 24%, preferably from about 10% to about 15%.

The polyoxyethylene derivatives of polyol esters of fatty acids are represented by polyoxyethylene (n) glyceryl monostearate or monopalmitate and polyoxyethylene (n) sorbitan monostearate or monopalmitate, in either of which (n) can be from about 5 to 100. The polyoxyethylene derivative is present in the powder at a level of from about 5% to about 15%, preferably from about 8% to about 12%. The polyoxyethylene derivative is preferably Polysorbate 60 (TWEEN 60™).

The diacetyl tartaric acid ester of monoglyceride has a fatty acid moiety which is esterified to the glycerine. The fatty acid can have from 10 to 24 carbons and can be saturated or unsaturated, preferably, the fatty acid is stearic acid. The diacetyl tartaric acid ester of monoglycerides is present in the powder at a level of from about 1 to about 5%, preferably from about 1% to about 3%.

The carrier for the powder is selected from a protein material, maltodextrins and corn syrup solids. The protein material can be an essentially-pure protein, as in the case of whey protein or casein, or as part of a protein containing material, such as dry non-fat milk solids, dried egg whites, soy protein, wheat protein and wheat gluten. Sweet whey is a preferred protein as it provides a desirable flavor when baked and contributes to browning of a baked product. The carrier is present in the powder at a level of from about 44% to about 64%, preferably from about 44% to about 54%.

The emulsifier powder is produced by spray drying. An encapsulating agent, such as sodium caseinate, is optionally present in the powder formulation to act as an encapsulating agent to assist making the powder free flowing. The encapsulating agent, if used, is present in the powder at a level of from about 1% to about 6%, preferably from about 1% to about 3%.

Dipotassium phosphate may optionally be present in the powder to function as a buffer and for pH adjustment. If present, the dipotassium phosphate is present at a level of from about 0.5% to about 3%, preferably from about 0.75% to about 2%.

In preparing the powder, the propylene glycol monoester and mono- and diglycerides are added to a steam jacketed kettle and heated to a temperature of about 140° F. Slow agitation is begun when the components are sufficiently melted. The Polysorbate 60 and diacetyl tartaric acid ester of monoglyceride are then added. Agitation is continued until a uniform mixture is attained. The sodium caseinate is added and thoroughly dispersed. Water, at a temperature of 160°–180° F. is added to provide a slurry having from about 35% to about 75% solids. The slurry is mixed for 5 minutes after which the sweet whey or other protein is added to the kettle. Mixing is continued until the protein is completely hydrated. The temperature is brought to 160°–170° F. and the mixture is held for 20 minutes. The slurry is then homogenized in a two-stage homogenizer using 2,000 psi combined with 1,500 psi in the first stage and 500 psi in the second stage. The slurry is then spray dried to provide the powder.

The powder is then combined with a mixture of vegetable fiber, starch and a gum to provide the fat replacement system of the invention. The powder is present in the fat replacement system at a level of from about 50% to about 80%, preferably from about 60% to about 70%.

The vegetable fiber used in the present invention is an insoluble fiber which can be any edible fiber material, including powdered cellulose. Fiber derived from cereal grains are preferred. Oat fiber, which contains a relatively-high level of insoluble fiber, soy fiber and wheat fiber are particularly preferred for use in the present invention. Most preferred is oat fiber. The particles of fiber have an average particle size of between about 10 and about 200 microns, preferably between 10 and 100 microns. The fiber is present in the mixture of vegetable fiber, starch and gum at a level of from about 45–55%.

The starch may be any of the food starches, such as corn starch, potato starch, tapioca starch and rice starch. Preferably, the starch is a pre-gelatinized starch. The starch is present in the mixture of vegetable fiber, starch and gum at a level of from about 45% to about 55%.

The gum is preferably a polysaccharide hydrocolloid and most preferably is a water soluble, non-gelling gum, such as xanthan, guar, carboxymethyl cellulose and the like. A preferred gum is xanthan gum. The gum is present in the mixture of vegetable fiber, starch and gum at a level of from about 0.5% to about 1.5%.

In another embodiment of the fat replacement system of the present invention, only two components are present in the powder, these being mono- and diglycerides and diacetyl tartaric ester monoglyceride. This embodiment is less flexible in use than the four emulsifier powder previously described, but is functional for certain chemically leavened baked goods, such as pound cake and white cake. In this embodiment, the carrier is present at a level of from about 42% to about 64%, the mono- and diglycerides are present at a level of from about 20% to about 42%, the diacetyl tartaric acid ester of monoglycerides is present at a level of from about 6% to about 18%. The powder is prepared by the same spray dry method previously described. In this embodiment, inulin may optionally be present at a level of from about 50% to about 70%.

In the final assembly of the fat replacement system, it is preferred to blend the gum with an anticaking agent, such as silicon dioxide or sodium silicon aluminate, prior to adding the gum to the other components of the fat replacement system in the mixture of vegetable fiber, starch and gum. The anticaking agent is used at a level of from about 0.75% to about 2%, based on the weight of the mixture of vegetable powder, starch and gum.

The following examples illustrate various features of the invention, but are intended to in no way limit the scope of the invention as set forth in the appended claims.

EXAMPLE 1

A fat replacement system was prepared from a powder and a mixture of a vegetable fiber, starch and a gum in accordance with the following formulations.

| Emulsifier Powder | |
|---|---|
| Ingredients | Weight %, Dry Basis |
| Sweet Dairy Whey | 47.74 |
| Propylene glycol monoester (PGME) 54% PGME, 15% total monoglycerides, 69.5 iodine value | 24.93 |
| Mono- and Diglycerides 43% alpha monoglyceride, 67.5% iodine value | 12.22 |
| Polysorbate 60 | 9.86 |
| Sodium Caseinate | 2.01 |
| Diacetyl Tartaric Acid Ester Mono- | 1.98 |

Emulsifier Powder

| Ingredients | Weight %, Dry Basis |
| --- | --- |
| glyceride (DATEM) less than 3 iodine value | |
| Dipotassium Phosphate | 1.26 |
| TOTAL | 100.00 |

1. Add propylene glycol monoester and mono- and diglycerides to a steam jacketed blend kettle and heat to 140° F. Begin agitation when sufficiently melted.

2. Add Polysorbate 60 and DATEM. Agitate until uniformly mixed.

3. Stream in sodium caseinate, disperse thoroughly.

4. Rapidly add sufficient water (160°–180° F.) to provide 40% solids in final slurry.

5. Stream in whey and hydrate completely.

6. Slowly add dipotassium phosphate (50% solids mixture).

7. Bring temperature to 160°–170° F. and hold for 20 minutes to pasteurize.

8. Homogenize on two stage homogenizer. Use 2000 psi combined (1500 psi first stage and 500 psi second stage).

9. Spray dry.

10. Screen through 40 mesh and package.

The final fat replacement system has the following components at the indicated levels:

| Ingredients | Weight %, Dry Basis |
| --- | --- |
| Spray Dried Emulsifier Base | 66.600 |
| Oat Fiber | 16.200 |
| Modified Food Starch | 16.370 |
| Xanthan Gum | 00.330 |
| Silicon Dioxide | 00.500 |

1. Preblend xanthan gum in the silicon dioxide.

2. Add all ingredients to the dry blender with xanthan gum mixture being last.

3. Blend until homogeneous, a minimum of 8 minutes.

4. Screen through 40 mesh.

5. Package.

EXAMPLE 2

The fat replacement system of Example 1 was used to produce a fat free pound cake having the following components at the indicated levels. A control pound cake was also produced which had conventional shortening.

| Ingredients | Control Weight % | Fat Free Weight % |
| --- | --- | --- |
| Vegetable Shortening | 7.05% | 0.00 |
| Margarine | 9.07 | 0.00 |
| Granulated Sugar | 28.72 | 31.73 |
| Cake Flour | 25.19 | 24.89 |
| Salt | 0.50 | 0.52 |
| Pregelatinized Tapioca Starch | 0.00 | 1.31 |
| Baking Powder | 0.00 | 0.78 |
| Vanilla Flavor | 0.00 | 0.21 |
| Flavor | 0.10 | 0.10 |
| Egg Shade Color | 0.15 | 0.03 |
| Liquid Egg Whites | 17.13 | 17.32 |
| NFDM | 1.21 | 0.00 |
| Water | 10.88 | 19.18 |
| Fat replacement system of Example 1 | 0.00 | 3.94 |
| TOTAL | 100.00 | 100.00 |

1. Blend all dry ingredients in Hobart mixer at low speed for one minute.

2. Add rest of ingredients, mix at low speed for one minute.

3. Mix for one minute at medium and one minute at high speed.

4. Scale 440 grams in a loaf pan cake.

5. Bake for 36 minutes at 380° F.

Evaluation - Control: Brown top, white specs, nice texture, yellow color, moist soft touch. Fat Free: golden brown hard top at edge, very soft inside, dense texture like pound cake.

EXAMPLE 3

A 98% fat free white cake was prepared using the fat replacement system of Example 1. A control white cake was also produced which had conventional shortening.

| Ingredients | Control Weight % | 98% Fat Free Weight % |
| --- | --- | --- |
| Granulated Sugar | 30.50 | 31.00 |
| Cake Flour | 23.35 | 23.67 |
| Emulsified Shortening | 5.90 | 0.00 |
| Lecithin | 0.05 | 0.00 |
| Non Fat Dry Milk | 2.09 | 2.12 |
| Baking Powder | 1.43 | 1.46 |
| Salt | 0.60 | 0.60 |
| Fat replacement system of Example 1 | 0.00 | 3.63 |
| N&A Vanilla Flavor DY08125 | 0.00 | 0.20 |
| Water | 24.80 | 26.66 |
| Fresh Egg Whites | 11.27 | 10.66 |
| Fat replacement system | 0.00 | 3.94 |
| TOTAL | 100.00 | 100.00 |
| Cake Score | 86 | 92 |
| Volume Index | 118 | 112 |
| Symmetry Index | 0 | 2 |
| Total Volume Index | 569 | 553 |

1. Thoroughly mix dry ingredients together.

2. Blend dry mix, water and egg whites in Sunbeam mixer.

3. Mix at speed one for one minute and speed eight for three minutes.

4. Bake at 350° F. for 25–27 minutes.

Evaluation Control: golden brown color, shriveled look top, top very tender. Fat Free: golden brown, top not as sticky, good cake for fat free.

EXAMPLE 4

A fat free pizza crust was made using the fat replacement system of Example 1. A control pizza crust was also produced which had conventional shortening.

| Ingredients | Control Weight % | Fat Free Weight % |
|---|---|---|
| Bread flour | 62.00 | 61.22 |
| Water | 32.36 | 34.66 |
| Granulated Sugar | 1.50 | 1.50 |
| Yeast | 0.60 | 0.60 |
| Salt | 0.90 | 0.90 |
| Soy Oil | 2.48 | 0.00 |
| Fat replacement system of Example 1 | 0.00 | 0.96 |
| SSL | 0.08 | 0.08 |
| Calcium Propionate | 0.08 | 0.08 |
| TOTAL | 100.00 | 100.00 |

1. Add one half of the water to the flour and mix for 5 minutes.

2. Hydrate yeast (warm water and half of sugar) for 10 minutes.

3. Add oil and rest of water. Mix on low speed for another minute.

4. Mix for 7 minutes on speed 2.

5. Scale 55 grams and flatten in pizza pan.

6. Proof for 20 minutes.

7. Bake for 10 minutes at 450° F.

Evaluation - Fat free gave better crumb color than control. It was very hard to tell the difference between both.

EXAMPLE 5

Fat free pancakes were made using the fat replacement system of Example 1. Control pancakes were also produced which had conventional shortening.

| Ingredients | Control Weight % | Fat Free Weight % |
|---|---|---|
| Low Fat (2%) Milk | 50.50 | 0.00 |
| All Purpose Flour | 25.88 | 26.72 |
| Eggs (Liquid) | 11.85 | 0.00 |
| Vegetable Oil | 6.45 | 0.00 |
| Sugar | 2.84 | 2.93 |
| Baking Powder | 2.18 | 2.27 |
| Salt | 0.30 | 0.32 |
| Non Fat Dry Milk | 0.00 | 5.74 |
| Water | 0.00 | 48.52 |
| Fat replacement system of Example 1 | 0.00 | 1.12 |
| Egg Whites (Liquid) | 0.00 | 12.38 |
| TOTAL | 100.00 | 100.00 |
| Specific Gravity | 1.03 | 1.03 |
| Water Temperature | 81° F. | 81° F. |

1. Blend dry ingredients together for 10 minutes in a Hobart mixer.

2. Prepare pancake batter by blending dry mix, water and eggs in Sunbeam mixer.

3. Mix at low speed until all lumps are broken up.

4. Mix for one minute at medium speed while continuously scraping the sides and pushing the batter into the beaters.

5. Fry on hot griddle (390° F.). Turn when edges dry.

Evaluation - Control: Light, fluffy and uniform. Fat Free: Light, fluffy, good taste, uniform with nice brown color.

EXAMPLE 6

Low fat waffles were made using the fat replacement system of Example 1. Control waffles were also produced which had conventional shortening.

| Ingredients | Control Weight % | Low Fat Weight % |
|---|---|---|
| All Purpose Flour | 33.88 | 36.64 |
| Egg Yolk (Liquid) | 5.15 | 5.57 |
| Vegetable Oil | 15.33 | 0.00 |
| Baking Powder | 1.48 | 1.60 |
| Salt | 0.43 | 0.46 |
| Non Fat Dry Milk | 3.86 | 4.18 |
| Water | 31.69 | 36.22 |
| Fat replacement system of Example 1 | 0.00 | 2.79 |
| Egg Whites (Liquid) | 8.18 | 12.54 |
| TOTAL | 100.00 | 100.00 |

1. Blend dry ingredients together for one mixture in a Hobart mixer.

2. Add egg yolks and stir into dry ingredients.

3. Stir in cooking oil. Carefully fold in egg whites (do not over mix).

4. Mix for one minute at medium speed while continuously scraping the sides.

5. Pour approximately 1 cup batter onto the preheated grid.

6. Close and bake.

Evaluation - Control: Smells oily, good color and very fluffy. Low Fat: Very good compared to control, little darker color.

EXAMPLE 7

A fat replacement system was prepared from an powder and a mixture of a vegetable fiber, starch and a gum in accordance with the following formulations:

| Powder | |
|---|---|
| Ingredients | Weight %, Dry Basis |
| Sweet Dairy Whey | 47.84 |
| Mono- and Diglycerides 43% alpha monoglyceride, 67.5 iodine value | 37.15 |
| Diacetyl Tartaric Acid Ester Monoglyceride (DATEM) less than 3 iodine value | 11.74 |
| Sodium Caseinate | 2.00 |
| Dipotassium Phosphate | 1.27 |
| TOTAL | 100.00 |

1. Add mono- and diglycerides to a steam jacketed blend kettle and heat to 140° F. Begin agitation when sufficiently melted.

2. Add DATEM. Agitate until uniformly mixed.

3. Stream in sodium caseinate, disperse thoroughly.

4. Rapidly add sufficient water (160°–180° F.) to provide 40% solids in final slurry.

5. Stream in whey and hydrate completely.

6. Slowly add dipotassium phosphate (50% solids mixture).

7. Bring temperature to 160°–170° F. and hold for 20 minutes to pasteurize.

8. Homogenize on two stage homogenizer. Use 2000 psi combined (1500 psi first stage and 500 psi second stage).

9. Spray dry.

10. Screen through 40 mesh and package.

The final fat replacement system has the following components at the indicated levels:

| Ingredients | Weight %, Dry Basis |
|---|---|
| Spray Dried Emulsifier Base | 66.600 |
| Oat Fiber | 16.200 |
| Modified Food Starch | 16.370 |
| Xanthan Gum | 00.330 |
| Silicon Dioxide | 00.500 |

1. Preblend xanthan gum in the silicon dioxide.

2. Add all ingredients to the dry blender with xanthan gum mixture being last.

3. Blend until homogeneous, a minimum of 8 minutes.

4. Screen through 40 mesh.

5. Package.

EXAMPLE 8

A fat-free, white cake was prepared using the fat replacement system of Example 7. A control white cake was also prepared which used the fat replacement system of Example 1.

| Ingredients | Fat-Free Weight % | Control Weight % |
|---|---|---|
| Granulated Sugar | 30.95 | 30.95 |
| Cake Flour | 23.70 | 23.70 |
| Non-Fat Dry Milk | 2.11 | 2.11 |
| Baking Soda | 0.43 | 0.43 |
| Salt | 0.60 | 0.60 |
| Monocalcium Phosphate | 0.43 | 0.43 |
| Sodium Aluminum Phosphate | 0.17 | 0.17 |
| Dicalcium Phosphate | 0.43 | 0.43 |
| Example 7 fat replacement system | 3.63 | 0.00 |
| Example 1 fat replacement system | 0.00 | 3.63 |
| Vanilla Flavor 1% | 0.40 | 0.40 |
| Water | 26.55 | 26.55 |
| Fresh Egg White | 10.62 | 10.62 |
| TOTAL | 100.00 | 100.00 |

1. Thoroughly mix dry ingredients together.

2. Blend dry mix, water and egg whites on Sunbeam Mixer.

3. Mix at speed one for one minute and speed eight for three minutes.

4. Bake at 350° F. for 25–27 minutes.

Evaluation - The white cake with the emulsifier of Example 7 had higher volume and higher cake score than the control white cake.

EXAMPLE 9

A fat replacement system was prepared from a powder and a mixture of vegetable fiber, starch and a gum in accordance with the following formulations:

| Ingredients | Powder Weight %, Dry Basis |
|---|---|
| Mono- and Diglycerides | 24.93 |
| Diacetyl Tartaric Acid Ester Monoglyceride (DATEM) | 7.88 |
| Sodium Caseinate (95% S) | 1.34 |
| Inulin | 63.85 |
| Dipotassium Phosphate (50% S) | 2.00 |
| TOTAL | 100.00 |

1. Add mono- and diglycerides to a steam jacketed blend kettle and heat to 140° F. Begin agitation when sufficiently melted.

2. Add DATEM. Agitate until uniformly mixed.

3. Stream in sodium caseinate, disperse thoroughly.

4. Rapidly add sufficient water (160°–180° F.) to provide 40% solids in final slurry.

5. Stream in inulin and hydrate completely.

6. Slowly add dipotassium phosphate (50% solids mixture).

7. Bring temperature to 160°–170° F. and hold for 20 minutes to pasteurize.

8. Homogenize on two stage homogenizer. Use 2000 psi combined (1500 psi first stage and 500 psi second stage).

9. Spray dry.

10. Screen through 40 mesh and package.

EXAMPLE 10

A 98% fat free white cake was prepared using the fat replacement system of Example 9. A control white cake was also produced which had conventional shortening.

| Ingredients | Control Weight % | 98% Fat Free Weight % |
|---|---|---|
| Granulated Sugar | 30.50 | 31.00 |
| Cake Flour | 23.35 | 23.67 |
| Emulsified Shortening | 5.90 | 0.00 |
| Lecithin | 0.05 | 0.00 |
| Non Fat Dry Milk | 2.09 | 2.12 |
| Baking Powder | 1.43 | 1.46 |
| Salt | 0.60 | 0.60 |
| Fat replacement system of Example 9 | 0.00 | 3.63 |
| N&A Vanilla Flavor DY08125 | 0.00 | 0.20 |
| Water | 24.80 | 26.66 |
| Fresh Egg Whites | 11.27 | 10.66 |
| Fat replacement system | 0.00 | 3.94 |
| TOTAL | 100.00 | 100.00 |
| Cake Score | 86 | 92 |
| Volume Index | 118 | 112 |
| Symmetry Index | 0 | 2 |
| Total Volume Index | 569 | 553 |

1. Thoroughly mix dry ingredients together.

2. Blend dry mix, water and egg whites in Sunbeam mixer.

3. Mix at speed one for one minute and speed eight for three minutes.

4. Bake at 350° F. for 25–27 minutes.

Evaluation - Control: golden brown color, shriveled look top, top very tender. Fat Free: golden brown, top not as sticky, good cake for fat free.

What is claimed is:

1. A particulate fat replacement system for use as a partial or complete replacement for shortening in flour based baked goods, said particulate fat replacement system comprising in combination:

(a) a powder which includes a carrier, propylene glycol monoester, mono- and diglycerides, a polyoxyethylene derivative of a polyol ester of fatty acids, and diacetyl tartaric acid ester of monoglycerides; and (b) an unhydrated mixture of a vegetable fiber, starch and a gum;

wherein said particulate fat replacement system is in the form of particles which are easily measured and dispensed for use in preparation of baked goods.

2. A fat replacement system in accordance with claim 1 wherein said carrier is sweet whey.

3. A fat replacement system in accordance with claim 1 wherein said vegetable fiber is oat fiber.

4. A fat replacement system in accordance with claim 1 wherein said starch is tapioca starch.

5. A fat replacement system in accordance with claim 1 wherein said gum is xanthan gum.

6. A fat replacement system in accordance with claim 1 wherein said carrier is present in said powder at a level of from about 44% to about 64%.

7. A fat replacement system in accordance with claim 1 wherein said propylene glycol monoester is present in said powder at a level of from about 14% to about 28%.

8. A fat replacement system in accordance with claim 1 wherein said mono- and diglycerides are present in said powder at a level of from about 9% to about 24%.

9. A fat replacement system in accordance with claim 1 wherein said polyoxyethylene derivative is present in said powder at a level of from about 5% to about 15%.

10. A fat replacement system in accordance with claim 1 wherein an encapsulating agent is present in said powder at a level of from about 1% to about 3%.

11. A fat replacement system in accordance with claim 1 wherein said diacetyl tartaric acid ester of monoglycerides is present in said powder at a level of from about 1% to about 6%.

12. A fat replacement system in accordance with claim 1 wherein said propylene glycol monoester and said polyoxyethylene derivative are deleted from said powder.

13. A fat replacement system in accordance with claim 12 wherein said mono- and diglycerides are present in said powder at a level of from about 20% to about 42% and said diacetyl tartaric acid ester of monoglycerides is present in said powder at a level of from about 6% to about 18%.

14. A fat replacement system in accordance with claim 1 wherein said powder is present in said emulsifier system at a level of from about 50% to about 80% by weight.

15. A fat replacement system in accordance with claim 1 wherein said vegetable fiber is present in said mixture of a vegetable fiber, starch and a gum at a level of from about 45% to about 55%.

16. A fat replacement system in accordance with claim 1 wherein said starch is present in said mixture of a vegetable fiber, starch and a gum at a level of from about 45% to about 55%.

17. A fat replacement system in accordance with claim 1 wherein said gum is present in said mixture of a vegetable fiber, starch and a gum at a level of from about 0.5% to about 1.5%.

18. A fat replacement system in accordance with claim 1 wherein an anticaking agent is also present in said mixture of a vegetable fiber, starch and a gum.

19. A fat replacement system in accordance with claim 17 wherein said anticaking agent is silicon dioxide, which is a present at a level in said mixture of a vegetable fiber, starch and a gum at a level of from about 0.75% to about 2%.

20. A fat replacement system in accordance with claim 1 wherein said polyoxyethylene derivative is polyoxyethylene (20) sorbitan monostearate.

21. A fat replacement system in accordance with claim 1 which includes an encapsulating agent.

22. A fat replacement system in accordance with claim 20 wherein said encapsulating agent is sodium caseinate.

23. A fat replacement system in accordance with claim 20 wherein said encapsulating agent is present at a level of from about 1% to about 6%.

24. A fat replacement system in accordance with claim 1 wherein dipotassium phosphate is present in said emulsifier powder at a level of from about 0.5% to about 3%.

25. A fat replacement system in accordance with claim 1 wherein said carrier is selected from the group consisting of a protein material, maltodextrins and corn syrup solids.

26. A baked food product having the fat replacement system of claim 1 incorporated therein.

27. A baked food product in accordance with claim 26 wherein said fat replacement system is present in the batter or dough used to provide the baked food product.

28. A baked food product in accordance with claim 27 wherein said fat replacement system is present at a level of from about 0.5% to about 5.0%.

29. A fat replacement system in accordance with claim 1 wherein said propylene glycol monoester and said polyoxyethylene derivative are deleted from said powder and inulin is present in said powder.

30. A fat replacement system in accordance with claim 29, wherein said inulin is present at a level of from about 50% to about 70%.

* * * * *